United States Patent
Kamegawa et al.

(10) Patent No.: US 8,986,838 B2
(45) Date of Patent: Mar. 24, 2015

(54) HOLLOW CARBON MICROPARTICLE AND METHOD FOR PRODUCING SAME

(75) Inventors: Katsumi Kamegawa, Tosu (JP); Tsuyoshi Sakaki, Tosu (JP); Kinya Sakanishi, Higashihiroshima (JP); Masaya Kodama, Tsukuba (JP); Keiko Nishikubo, Tosu (JP); Yoshio Adachi, Tosu (JP)

(73) Assignee: National Institute of Advanced Industrial Science and Technology, Tokyo (JP)

(*) Notice: Subject to any disclaimer, the term of this patent is extended or adjusted under 35 U.S.C. 154(b) by 346 days.

(21) Appl. No.: 13/145,051

(22) PCT Filed: Dec. 11, 2009

(86) PCT No.: PCT/JP2009/006801
§ 371 (c)(1),
(2), (4) Date: Jul. 18, 2011

(87) PCT Pub. No.: WO2010/084547
PCT Pub. Date: Jul. 29, 2010

(65) Prior Publication Data
US 2011/0281113 A1 Nov. 17, 2011

(30) Foreign Application Priority Data
Jan. 22, 2009 (JP) ................................. 2009-012409

(51) Int. Cl.
*C01B 31/02* (2006.01)
*B32B 5/16* (2006.01)
*B82Y 30/00* (2011.01)
*B82Y 40/00* (2011.01)

(52) U.S. Cl.
CPC .............. *C01B 31/02* (2013.01); *B82Y 30/00* (2013.01); *B82Y 40/00* (2013.01); *C01B 31/0206* (2013.01); *C01P 2004/34* (2013.01); *C01P 2004/61* (2013.01)
USPC ......... 428/402.2; 428/403; 428/404; 65/21.4; 423/445 R

(58) Field of Classification Search
CPC C04B 28/26; C04B 40/0263; C04B 40/0259; C04B 14/48; C04B 20/002; C04B 28/008; C04B 2103/002; C04B 22/062; C04B 14/02; C04B 20/1062; C04B 2111/28; C04B 2111/343; C04B 2235/3203; C04B 2235/05
USPC ................ 428/402–402.24, 403, 404, 407; 427/331, 389.9, 212, 213.3–213.36, 427/483, 256; 264/534, 41, 5, 4–4.7; 424/400, 408, 450, 451, 455, 93.7, 424/184.1, 497, 489, 501, 490, 491, 4, 92, 424/493, 494, 495
See application file for complete search history.

(56) References Cited

U.S. PATENT DOCUMENTS

| | | | |
|---|---|---|---|
| 3,775,344 A | 11/1973 | Amagi et al. | |
| 3,886,093 A | 5/1975 | Dimitri | |
| 5,492,870 A * | 2/1996 | Wilcox et al. | 501/80 |
| 5,849,055 A * | 12/1998 | Arai et al. | 65/17.3 |
| 5,972,537 A | 10/1999 | Mao et al. | |
| 2007/0207081 A1 | 9/2007 | Takikawa et al. | |
| 2010/0304141 A1 | 12/2010 | Kamegawa et al. | |

FOREIGN PATENT DOCUMENTS

| | | |
|---|---|---|
| JP | 03-164416 | 7/1991 |
| JP | 7-187849 | 7/1995 |
| JP | 7-267618 | 10/1995 |
| JP | 11-268907 | 10/1999 |
| JP | 2001-220114 | 8/2001 |
| JP | 2002-241116 | 8/2002 |
| JP | 2002-344194 | 11/2002 |
| JP | 2004-526652 | 9/2004 |
| JP | 2005-053745 | 3/2005 |
| JP | 2005-281065 | 10/2005 |
| JP | 2005-289666 | 10/2005 |
| JP | 2006-075708 | 3/2006 |
| JP | 2007-001810 | 1/2007 |
| JP | 2007-254243 | 10/2007 |
| JP | 2009-155199 | 7/2009 |
| WO | 2006/046656 | 5/2006 |

OTHER PUBLICATIONS

Restriction Requirement for U.S. Appl. No. 12/745,148; Jan. 20, 2012.
1st Office Action for U.S. Appl. No. 12/745,148; Mar. 29, 2012.
Paunov et al., Fabrication of Carbon Nanotube-Based Microcapsules by a Colloid Templating Technique, Nanotechnology 16, 2005,1522-1525.
Hou et al., ""Carbon Nanotubes and Spheres Produced by Modified Ferrocene Pyrolysis"", Chem. Mater. 2002, 14, 3990-3994.
International Search Report of PCT/JP2008/070961, mailing date of Jan. 20, 2009.
English-language machine translation of JP7-187849, 6 pages, (1995).
English-language machine translation of JP7-267618, 10 pages, (1995).

(Continued)

*Primary Examiner* — James J Seidleck
*Assistant Examiner* — S. Camilla Pourbohloul
(74) *Attorney, Agent, or Firm* — Kagan Binder, PLLC

(57) ABSTRACT

Elastic and ultra-lightweight hollow carbon fine particles and a method for producing such hollow carbon fine particles are to be provided. In the method, fine droplets are formed from a mixed solution containing a water soluble organic substance and lithium carbonate; composite fine particles of the water soluble organic substance and the lithium carbonate are prepared by drying the fine droplets formed from the mixed solution; and the composite fine particles are decomposed at a temperature in a range of 500° C. to 900° C.

5 Claims, 3 Drawing Sheets

(56) References Cited

OTHER PUBLICATIONS

English-language machine translation of 2007-254243, 21 pages, (2007).
English-language machine translation of 11-268907, 7 pages, (1990).
Hisashi Tamai et al., Journal of Colloid and Interface Science, vol. 177, 325-328 (1996).
Jyongsik Jang et al., Advanced Materials, vol. 14, 1390-1393 (2002).
Jyongsik Jang et al., Chemistry of Materials, vol. 15, 2109-2111 (2003).
Minsuk Kim et al., Microporous and Mesoporous Materials, vol. 63, 1-9 (2003).
Katsumi Kamegawa et al., "Poster Session 1," Particles 2009, Jul. 12, 2009 (issue date of proceeding Jul. 11, 2009).
Non-Final Office Action, U.S. Appl. No. 13/536,053, mailed Aug. 6, 2014.

* cited by examiner

FIG. 1

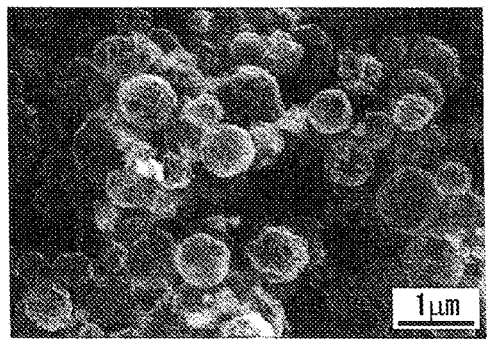

Elastic hollow carbon fine particles prepared by ultrasonic atomization
from a solution of water soluble phenol resin and lithium carbonate.

FIG. 2

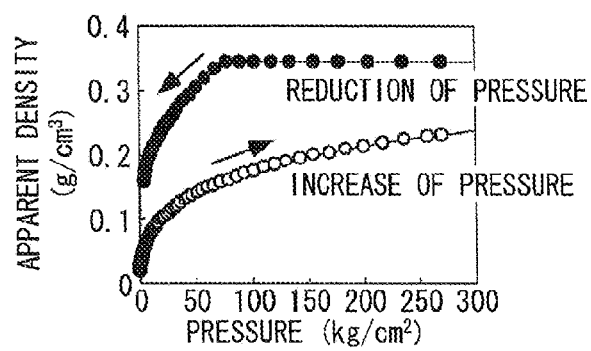

A result of measurement of hollow carbon fine particles
in regard to a relation between pressure and apparent density
by use of a mercury porosimeter.

FIG. 3

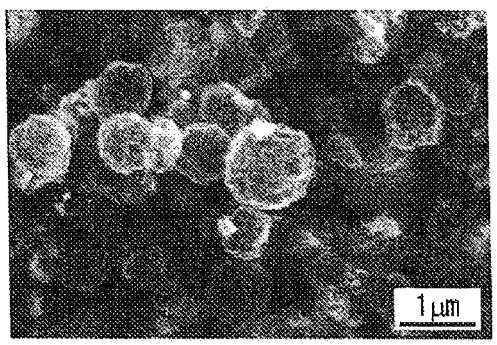

Hollow carbon fine particles having been measured
by use of a mercury porosimeter.

F I G. 4
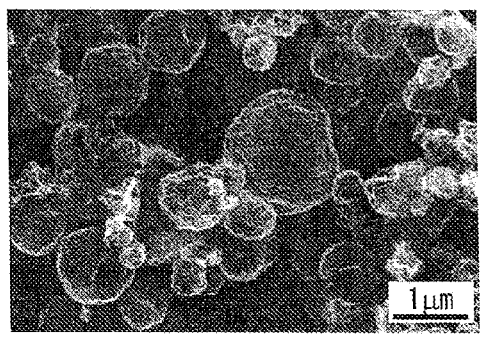
Hollow carbon fine particles prepared by ultrasonic atomization
from a solution of alkali lignin and lithium carbonate.
F I G. 5
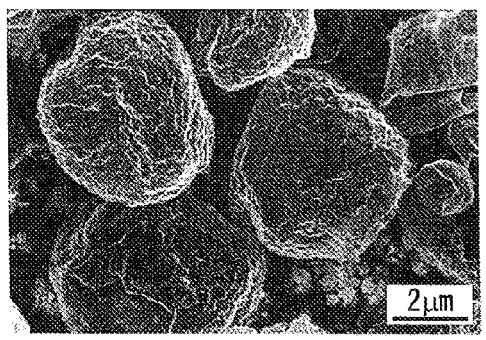
Hollow carbon fine particles prepared by spray drying
from a solution of sodium lignosulfonate and lithium carbonate.
F I G. 6
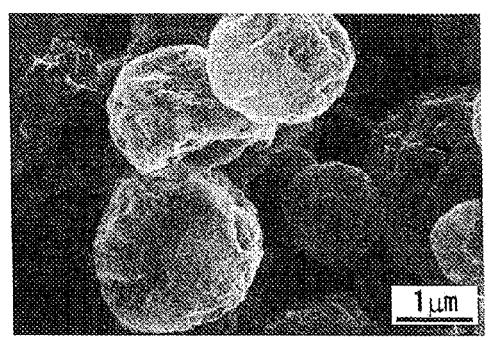
Hollow carbon fine particles prepared by spray drying
from a solution of sucrose and lithium carbonate.

F I G. 7
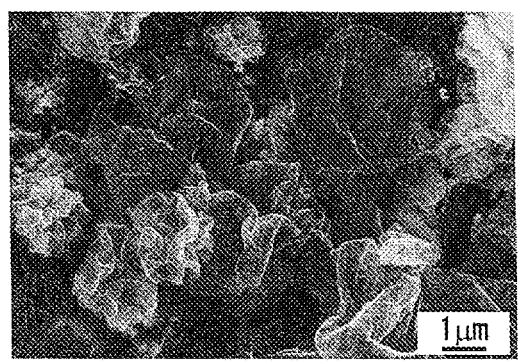
Carbon fine particles prepared by spray drying
from a solution of alkali lignin and sodium carbonate.

HOLLOW CARBON MICROPARTICLE AND METHOD FOR PRODUCING SAME

TECHNICAL FIELD

The present invention relates to hollow carbon fine particles and a method for producing the hollow carbon fine particles. In particular, the present invention relates to elastic and ultra-lightweight hollow carbon fine particles and a method for producing such hollow carbon fine particles.

BACKGROUND ART

In recent years, many composite materials have played important roles in various fields. Many of such composite materials are produced by forming a composite of a matrix such as plastic or rubber and an additive called a filler. Regarding the filler, there is a demand for development of very light and fine filler that can contribute to resource saving and energy saving more than ever. This is because there has arisen a problem worldwide such as global warming or a rise in price of petroleum resources. As a light filler, a hollow balloon made of a material such as an organic polymer, ceramics, and/or carbon has been already developed.

Examples of a method for producing the hollow balloon (hollow carbon fine particles) are disclosed in Patent Literatures 1 to 3. Patent Literature 1 discloses thermal decomposition of thermo-plastic resin fine particles to which activated carbon powder is attached. Patent Literature 2 discloses deposition of hollow fine carbon having a non-graphite structure from carbon evaporated by thermal plasma. Further, Patent Literature 3 discloses thermal treatment of a carbon black having a specific form at a temperature of 2000° C. or more. In addition to the methods for producing the hollow carbon fine particles disclosed in Patent Literatures 1 to 3, Non-Patent Literatures 1 to 4 are reported as scientific papers.

CITATION LIST

Patent Literature

[Patent Literature 1]
   Japanese Patent Application Publication, Tokukaihei, No. 07-187849 A (published on Jul. 25, 1995)
[Patent Literature 2]
   Japanese Patent Application Publication, Tokukaihei, No. 07-267618 A (published on Oct. 17, 1995)
[Patent Literature 3]
   Japanese Patent Application Publication, Tokukai, No. 2005-281065 A (published on Oct. 13, 2005)

Non-Patent Literature

[Non-Patent Literature 1]
   Hisashi Tamai et. al., Journal of Colloid and Interface Science, Vol. 177, 325-328 (1996)
[Non-Patent Literature 2]
   Jyongsik Jang et. al., Advanced Materials, Vol. 14, 1390-1393 (2002)
[Non-Patent Literature 3]
   Jyongsik Jang et. al., Chemistry of Materials, Vol. 15, 2109-2111 (2003)
[Non-Patent Literature 4]
   Minsuk Kim et. al., Microporous and Mesoporous Materials, Vol. 63, 1-9 (2003)

SUMMARY OF INVENTION

Technical Problem

However, the methods for producing hollow carbon fine particles as disclosed in Patent Literatures 1 to 3 and Non-Patent Literatures 1 to 4 have the following problems: (i) production processes are complex; (ii) a particles size of hollow fine carbon particles obtained is large; (iii) as a weight of the hollow carbon fine particles is reduced, strength of the hollow carbon fine particles drastically deteriorates and the hollow carbon fine particles tend to be destroyed at the time when a composite is formed from the hollow carbon fine particles and other material; and (iv) the like. Further, ultra-lightweight hollow carbon fine particles that has a sufficient elasticity that allows the hollow carbon fine carbon particles to withstand blending with a matrix, or the like, have not been developed so far.

The present invention is attained in view of the above conventional problems. An object of the present invention is to provide elastic and ultra-lightweight hollow carbon fine particles, and a method for producing such hollow carbon fine particles.

Solution to Problem

As a result of diligent studies on the above problems, the inventors of the present invention have uniquely found that elastic and ultra-lightweight hollow carbon fine particles can be obtained by the steps of: forming fine droplets from a mixed solution containing a water soluble organic substance and lithium carbonate; preparing composite fine particles of the water soluble organic substance and the lithium carbonate from the mixed solution formed into the fine droplets; and thermally decomposing the composite fine particles at a predetermined temperature. Consequently, the inventors of the present invention have achieved the present invention.

That is, in order to solve the above problems, a method of the present invention for producing elastic hollow carbon fine particles includes the steps of: forming fine droplets from a mixed solution containing a water soluble organic substance and lithium carbonate; preparing composite fine particles of the water soluble organic substance and the lithium carbonate by drying the fine droplets formed from the mixed solution; and thermally decomposing the composite fine particles at a temperature in a range of 500° C. to 900° C.

According to the above invention, by thermally decomposing the water soluble organic substance at a temperature in a range of 500° C. to 900° C., carbon can be generated. Further, according to the above invention, by forming fine droplets from a mixed solution containing a water soluble organic substance and lithium carbonate, ultimately obtained carbon can be fine particles. Further, according to the above invention, by containing lithium carbonate, it is possible to control a thickness of carbon wall (shell-like part forming the hollow carbon fine particles). As a ratio at which lithium carbonate is contained increases, the thickness of carbon wall of the carbon fine particles decreases.

Note that in a case where an inorganic substance other than lithium carbonate is contained, only fragile carbon fine particles can be obtained. However, only when lithium carbonate is contained, generated hollow carbon fine particles exhibit elasticity (flexibility).

As a result, according to the method of the present invention for producing hollow carbon fine particles, it is possible to produce elastic and ultra-lightweight hollow carbon fine particles. Accordingly, it also becomes possible to provide a low-cost and ultra-lightweight carbon filler.

Advantageous Effects of Invention

As described above, a method of the present invention for producing elastic hollow carbon fine particles includes the steps of: forming fine droplets from a mixed solution containing a water soluble organic substance and lithium carbonate; preparing composite fine particles of the water soluble organic substance and the lithium carbonate by drying the fine droplets formed from the mixed solution; and thermally decomposing the composite fine particles at a temperature in a range of 500° C. to 900° C.

Therefore, according to the method of the present invention for producing hollow carbon fine particles, it is possible to produce elastic and ultra-lightweight hollow carbon fine particles.

BRIEF DESCRIPTION OF DRAWINGS

FIG. 1 is a diagram showing an appearance of hollow carbon fine particles according to Example 1 of the present invention, under an SEM (Scanning Electron Microscope fabricated by Hitachi, Ltd., Product Name: "S-4300").

FIG. 2 is a graph showing a relation of a pressure and an apparent density of the hollow carbon fine particles according to Example 1 of the present invention.

FIG. 3 is a diagram showing an appearance of the hollow carbon fine particles according to Example 1 of the present invention, under an SEM.

FIG. 4 is a diagram showing an appearance of hollow carbon fine particles according to Example 2 of the present invention, under an SEM.

FIG. 5 is a diagram showing an appearance of hollow carbon fine particles according to Example 3 of the present invention, under an SEM.

FIG. 6 is a diagram showing an appearance of hollow carbon fine particles according to Example 4 of the present invention, under an SEM.

FIG. 7 is a diagram showing an appearance of carbon fine particles according to Comparative Example 1 of the present invention, under an SEM.

DESCRIPTION OF EMBODIMENTS

The following describes the present invention in detail. However, the present invention is not limited to the description but encompasses, in addition to the following examples, embodiments obtained by appropriate modification made by a skilled person within the scope that does not deviate from the object of the present invention. More specifically, the present invention is by no means limited to the following embodiments but encompasses various modifications made within the scope of the claims. In other words, an embodiment based on a proper combination of technical means disclosed in different embodiments is encompassed in the technical scope of the present invention, provided such embodiment does not exceed the scope of the patent claims. Note that in the present specification, for convenience, "mass percent" may be simply denoted as "%". Further, "A to B" indicating a range means "not less than A and not more than B".

(I) Substances, Treatments, and the Like Used in Method for Producing Hollow Carbon Fine Particles According to Present Invention

[Water Soluble Organic Substance]

A water soluble organic substance used in the present invention is not specifically limited as long as the water soluble organic substance has water solubility and generates carbon by thermal treatment. Examples of the water soluble organic substance are organic substances such as phenol resin, celluloses, lignin, polyvinyl alcohol, and/or sugar. Further, the water soluble organic substance used in the present invention may be a mixture of the above organic substances. For example, in a case sucrose is used as the water soluble organic substance, sucrose melts in thermal treatment and then carbonized. However, even in a case where such an organic substance that melts is used as the water soluble organic substance, hollow carbon fine particles can be produced. Therefore, many water soluble organic substances can be used as a material for the present invention.

[Mixed Solution Containing Water Soluble Organic Substance and Lithium Carbonate]

A mixed solution containing the water soluble organic substance and lithium carbonate used in the present invention is preferably a solution that contains, as main components, the water soluble organic substance and lithium carbonate.

Further, in the method of the present invention for producing the hollow carbon fine particles in the present invention, a mass proportion of the water soluble organic substance and the lithium carbonate is preferably in a range of 1:3 to 1:20.

Here, the mixed solution may be an organic solution, a slurry, or the like, other than a water solution. The organic solution, the slurry or the like contains another organic substance in addition to the water soluble organic substance.

[Formation of Fine Droplets]

"Formation of fine droplets" in the present invention means forming fine droplets having a diameter in a range of approximately 0.1 μm to 100 μm from a solution by a method such as spraying, ultrasonic atomization, or the like.

[Composite Fine Particles of Water Soluble Organic Substance and Lithium Carbonate]

Composite fine particles of a water soluble organic substance and lithium carbonate which composite fine particles are prepared in the present invention may contain a substance other than the water soluble organic substance and lithium carbonate, as long as the composite fine particles contain the water soluble organic substance and lithium carbonate. The composite fine particles preferably contain, as main components, the water soluble organic substance and lithium carbonate.

[Thermal Decomposition]

"Thermal decomposition" in the present invention indicates carbonizing the water soluble organic substance by heating the composite fine particles of the water soluble substance and lithium carbonate at a temperature in a range of 500° C. to 900° C., more preferably, in a range of 600° C. to 800° C. Note that the heating is carried out by a conventionally known method.

(II) Method for Producing Hollow Carbon Fine Particles in Present Invention

In the present invention, first, the fine droplets are formed from the mixed solution of the water soluble organic substance and lithium carbonate. Then, by drying the fine droplets of the mixed solution, the composite fine particles of the water soluble organic substance and lithium carbonate are prepared. Next, the composite fine particles are thermally decomposed at a temperature in a range of 500° C. to 900° C. and left to be cooled. As a result, carbon fine particles are produced. Further, if necessary, an inorganic substance is removed by cleaning the thermally decomposed product by use of water or the like and then the carbon fine particles are dried. The hollow carbon fine particles produced in this way have a diameter in a range of 0.1 µm to 50 µm. Further, The hollow carbon fine particles has a bulk density of 3 g/L to 30 g/L and therefore very light. In addition, the hollow carbon fine particles are elastic.

In the present invention, the drying of the fine droplets and thermal decomposition of the fine particles can be carried out separately or simultaneously in one reactor vessel.

(III) Physical Properties and the Like of Hollow Carbon Fine Particles in Present Invention The hollow carbon fine particles of the present invention are obtained by the above production method. Here, the hollow carbon fine particles is carbon fine particles each having a cavity therein. An outer diameter of the hollow carbon fine particles in the present invention is in a range of 0.1 µm to 50 µm and a bulk density of this hollow carbon fine particles is in a range of 3 g/L to 30 g/L. Further, the hollow carbon fine particles have elasticity.

As a result of development of the hollow carbon fine particles of the present invention, it becomes possible to provide a low-cost and ultra-lightweight fine carbon filler. Further, because this material is elastic, production of a composite material becomes easy. Accordingly, the weight of the composite material can be effectively reduced. This contributes to energy saving. Further, it becomes possible to give the composite material excellent properties such as electric conductivity, heat resistance and/or the like.

(IV) Preferred Embodiments of Present Invention

The method of the present invention for producing hollow carbon fine particles preferably includes the steps of cleaning the thermally-decomposed hollow carbon fine particles by use of water and then drying the hollow carbon fine particles.

This makes it possible to produce pure hollow carbon fine particles according to the method of the present invention for producing the hollow carbon fine particles.

Further, according to the method of the present invention for producing the hollow carbon fine particles, a mass proportion of the water soluble organic substance and the lithium carbonate is preferably in a range of 1:3 to 1:20.

As a result, according to the method of the present invention for producing the hollow carbon fine particles, a thickness of carbon wall can be further controlled and the carbon fine particles generated become elastic.

Further, according to the method of the present invention for producing the hollow carbon fine particles, the water soluble organic substance is preferably lignin.

Lignin is abundantly present in a natural world, in particular, in woods. Therefore, if the hollow carbon fine particles are made from a material containing lignin, this can greatly contribute to a shift from a petroleum resource to a biological resource.

Further, the hollow carbon fine particles of the present invention can be obtained by the above method for producing hollow carbon fine particles. This hollow carbon fine particles of the present invention has an outer diameter in a range of 0.1 µm to 50 µm and a bulk density in a range of 3 g/L to 30 g/L.

As a result, the hollow carbon fine particles of the present invention are light in weight. Therefore, it is possible to solve a problem that hollow carbon fine particles are lower in strength in accordance with such a reduction in weight and then are easily destroyed at the time when a composite is formed from the hollow carbon fine particles and other material.

EXAMPLES

The following describes Examples relating to the method of the present invention for producing the hollow carbon fine particles, with reference to FIGS. 1 to 6.

Example 1

Fine droplets were formed in ultrasonic atomization by use of an ultrasonic atomizer (fabricated by Honda Electronics Co., Ltd., Product Name "UD-2000H"), from a solution containing water soluble phenol resin at a concentration of 0.15 w/v % and lithium carbonate at a concentration of 1 w/v %. The fine droplets were mixed with the air heated to approximately 100° C. and dried, and composite fine particles generated were collected by use of a bag filter. The collected composite fine particles were then subjected to one-hour heat treatment at a temperature of 700° C. in a nitrogen atmosphere and left to be cooled. Then, the composite fine particles were cleaned by use of water and dried. As a result, the hollow carbon fine particles shown in FIG. 1 were produced. The hollow carbon fine particles had a diameter in a range of approximately 0.2 µm to 0.8 µm. Further, the hollow carbon fine particles had a bulk density of 12 g/L and were very light.

Note that FIG. 1 is an SEM photograph of the hollow carbon fine particles prepared by forming fine droplets of the mixed solution of the water soluble phenol resin and lithium carbonate by ultrasonic atomization and then carrying out drying, thermal decomposition, cleaning, and further drying.

Here, in a case where the hollow carbon fine particles are used as a filler, destruction of the particles in blending is a problem. In order to solve this problem, a relation of a pressure applied on a sample and an apparent density of the sample was examined by use of a mercury porosimeter (fabricated by Shimadu Corporation, Product Name: "Autopore 9520). As a result, a relation as shown in FIG. 2 was obtained. Note that the apparent density means a weight per unit volume occupied by the sample. Even when the pressure applied was increased up to 4200 $kg/cm^2$, the apparent density of the sample at the application of the maximum pressure onto the sample was 0.34 $g/cm^3$. Meanwhile, when the pressure was decreased, it was found that: the apparent density did not change until the pressure reached down to 80 $kg/cm^2$; however, when the pressure went under 80 $kg/cm^2$, the apparent density suddenly fell and the volume of the hollow carbon fine particles increased.

Note that FIG. 2 shows a result of measuring an apparent density by use of a mercury porosimeter at the time when the pressure applied on the hollow carbon fine particles shown in FIG. 1 is increased/decreased.

Though the mercury porosimeter can only measure up to 3 $kg/cm^2$ on a lower pressure side, a result of SEM observation carried out again on the sample after completion of measurement is shown in FIG. 3. The hollow carbon fine particles of FIG. 3 keeps a shape of the hollow carbon fine particles that has not yet been measured. This means that the hollow carbon fine particles are elastic.

Note that FIG. 3 is an SEM photograph of the hollow carbon fine particles at the time when the measurement by use of the mercury porosimeter has been completed and the pressure is set back to a normal pressure.

Example 2

Fine droplets were formed in ultrasonic atomization from a solution containing alkali lignin at a concentration of 0.1 w/v % and lithium carbonate at a concentration of 1 w/v %. The fine droplets were mixed with the air heated to approximately 100° C. and dried, and composite fine particles generated were collected by use of a bag filter. The collected composite fine particles were then subjected to one-hour heat treatment at a temperature of 700° C. in a nitrogen atmosphere. Then, the composite fine particles were cleaned by use of water and dried. As a result, the hollow carbon fine particles shown in FIG. 4 were produced. The hollow carbon fine particles had a diameter in a range of approximately 0.2 μm to 0.8 μm. Further, the hollow carbon fine particles had a bulk density of 9 g/L and were very light. Like the hollow carbon fine particles of Example 1, the hollow carbon fine particles of Examples 2 after the measurement by use of the mercury porosimeter kept a shape of the hollow carbon fine particles that had not yet been measured.

Note that FIG. 4 is an SEM photograph of the hollow carbon fine particles prepared by forming fine droplets of the mixed solution of alkali lignin and lithium carbonate by ultrasonic atomization and then carrying out drying, thermal decomposition, cleaning, and further drying.

Example 3

A solution containing sodium lignosulfonate at a concentration of 0.1 w/v % and lithium carbonate at a concentration of 1 w/v % was dried by spray drying at 90° C. by use of a spray driver (EYELA Tokyo Rikakikai Co., Ltd., Product Name: "SD-1000"). Then, composite fine particles generated were collected by use of a cyclone collector. The collected composite fine particles were then subjected to one-hour heat treatment at a temperature of 700° C. in a nitrogen atmosphere. Then, the composite fine particles were cleaned by use of water and dried. As a result, the hollow carbon fine particles shown in FIG. 5 were produced. The hollow carbon fine particles had a diameter in a range of approximately 1 μm to 5 μm. Further, the hollow carbon fine particles had a bulk density of 9 g/L and were very light.

Note that FIG. 5 is an SEM photograph of the hollow carbon fine particles prepared by forming fine droplets of the mixed solution of sodium lignosulfonate and lithium carbonate by spraying and then carrying out drying, thermal decomposition, cleaning, and further drying.

Example 4

A solution containing sucrose at a concentration of 0.3 w/v % and lithium carbonate at a concentration of 1 w/v % was dried by spray drying at 90° C. Then, composite fine particles generated were collected by use of a cyclone collector. The collected composite fine particles were then subjected to one-hour heat treatment at a temperature of 700° C. in a nitrogen atmosphere. Then, the composite fine particles were cleaned by use of water and dried. As a result, the hollow carbon fine particles shown in FIG. 6 were produced. The hollow carbon fine particles had a diameter in a range of approximately 1 μm to 2 μm. Further, the hollow carbon fine particles had a bulk density of 18 g/L and were very light. Sucrose is first melted by heat treatment and then carbonized. However, even by using such an organic material like sucrose that melts, the hollow carbon fine particles can be produced. Therefore, many water soluble organic substances can be used as a material for the present invention.

Note that FIG. 6 is an SEM photograph of the hollow carbon fine particles prepared by forming fine droplets of the mixed solution of sucrose and lithium carbonate by spraying and then carrying out drying, thermal decomposition, cleaning, and further drying.

Comparative Example 1

Fine droplets were formed from a solution containing alkali lignin at a concentration of 0.1 w/v % and sodium carbonate at a concentration of 1 w/v % and dried at 90° C. by spray drying. Then, composite fine particles generated were collected by use of a cyclone collector. The collected composite fine particles were then subjected to one-hour heat treatment at a temperature of 700° C. in a nitrogen atmosphere. Then, the composite fine particles were cleaned by use of water and dried. As a result, the hollow carbon fine particles shown in FIG. 7 were produced. In a case where sodium carbonate was used, the carbon fine particles could not keep their hollow structures and were destroyed. Unlike the case where the carbon fine particles were produced by using lithium carbonate, the carbon fine particles did not show flexibility in the case where sodium carbonate was used.

Examples 1 to 4 and Comparative Example 1

In Examples, a mass proportion of the water soluble organic substance and lithium carbonate is in a range of approximately 1:3 to 1:10 in the production of the carbon fine particles. This mass proportion depends on a proportion at which the water soluble organic substance generates carbon. Accordingly, the production of the carbon fine particles is carried out preferably in a range of approximately 1:3 to 1:20.

Regarding means for forming fine droplets in Examples, ultrasonic atomization was employed in Examples 1 and 2 and spraying was employed in Examples 3 and 4 and Comparative Example 1. However, the means for forming fine droplets are not limited to the above means but may be other means. Further, though drying of the fine droplets and thermal decomposition of the fine particles are carried out separately, the drying and the thermal decomposition may be carried out simultaneously in one reactor vessel. In addition, cleaning and drying of a product as a result of the thermal decomposition may be carried out according to need.

[Specific Surface Areas of Hollow Carbon Fine Particles]

Table 1 shows a result of measuring specific surface areas and pore volumes of the hollow carbon fine particles of Examples 1 to 3 and commercially available activated carbon.

TABLE 1

| | Specific Surface Area $(m^2g^{-1})$ | micro-pore $(cm^3g^{-1})$ | meso-pore $(cm^3g^{-1})$ |
|---|---|---|---|
| Example 1 | 1100 | 0.08 | 2.31 |
| Example 2 | 1400 | 0.05 | 2.76 |
| Example 3 | 1470 | 0.15 | 2.19 |
| Commercially Available Activated Carbon | 910 | 0.39 | 0.05 |

The hollow carbon fine particles of Examples 1 to 3 have larger specific surface areas, as compared to the commercially available activated carbon. Further, the hollow carbon fine particles of Examples 1 to 3 have less micro-pores but have a very large number of meso-pores, as compared to the commercially available activated carbon. Because the hollow carbon fine particles of Examples 1 to 3 have very large specific surface areas, these hollow carbon fine particles can be considered as activated carbon fine particles and used in various applications.

The concrete embodiments and examples of implementation discussed in the foregoing detailed explanation serve solely to illustrate the technical details of the present invention, which should not be narrowly interpreted within the limits of such concrete embodiments and examples, but rather may be applied in many variations within the spirit of the present invention, provided such variations do not exceed the scope of the patent claims set forth below.

INDUSTRIAL APPLICABILITY

The hollow carbon fine particles of the present invention can be used as a reinforcing agent for rubber of a tire or the like. Further, because the hollow carbon fine particles of the present invention has a very light weight and a specific surface area that is larger than that of commercially available activated carbon, the use of the hollow carbon fine particles of the present invention as a ultra-lightweight filler, a heat insulator, activated carbon, a controlled release tablet, a conductive material, an antistatic agent, and the like are expected in addition to the use of the hollow carbon fine particles of the present invention as the reinforcing agent for rubber of a tire or the like.

The invention claimed is:

1. A method for producing hollow carbon fine particles, the method comprising the steps of:

forming fine droplets from a mixed solution containing a water soluble organic substance and lithium carbonate;

preparing composite fine particles of the water soluble organic substance and the lithium carbonate by drying the fine droplets formed from the mixed solution; and thermally decomposing the composite fine particles at a temperature in a range of 500° C. to 900° C. to produce hollow carbon fine particles, the hollow carbon fine particles having:

a density of 3 to 30 g/L when no pressure is applied thereto;

a density that increases upon application of a pressure of 4200 kg/cm$^2$, and a shape that is kept substantially unchanged before and after application of a pressure of 4200 kg/cm$^2$.

2. The method as set forth in claim 1, wherein:

the hollow carbon fine particles are subsequently cleaned by use of water and dried.

3. The method as set forth in claim 1, wherein:

a mass proportion of the water soluble organic substance and the lithium carbonate is in a range of 1:3 to 1:20.

4. The method as set forth in claim 1 wherein:

the water soluble organic substance is lignin.

5. The method as set forth in claim 1 wherein: the hollow carbon fine particles have an outer diameter in a range of 0.1 μm to 50 μm.

* * * * *